United States Patent
Caretti et al.

(10) Patent No.: US 9,924,475 B2
(45) Date of Patent: Mar. 20, 2018

(54) METHOD FOR MANAGING DATA TRANSMISSION POWER IN MOBILE CELLULAR NETWORKS

(71) Applicant: Telecom Italia S.p.A., Milan (IT)

(72) Inventors: Marco Caretti, Turin (IT); Dario Sabella, Turin (IT); Giovanni Stea, Pisa (IT); Antonio Virdis, Pisa (IT)

(73) Assignee: Telecom Italia S.p.A., Milan (IT)

( * ) Notice: Subject to any disclaimer, the term of this patent is extended or adjusted under 35 U.S.C. 154(b) by 0 days.

(21) Appl. No.: 15/534,873

(22) PCT Filed: Dec. 11, 2014

(86) PCT No.: PCT/EP2014/077349
§ 371 (c)(1),
(2) Date: Jun. 9, 2017

(87) PCT Pub. No.: WO2016/091308
PCT Pub. Date: Jun. 16, 2016

(65) Prior Publication Data
US 2017/0339646 A1    Nov. 23, 2017

(51) Int. Cl.
*H04W 52/34* (2009.01)
*H04W 52/24* (2009.01)
(Continued)

(52) U.S. Cl.
CPC ....... *H04W 52/343* (2013.01); *H04W 52/244* (2013.01); *H04W 52/143* (2013.01); *H04W 84/045* (2013.01)

(58) Field of Classification Search
CPC ........................... H04W 52/34; H04W 72/1226
(Continued)

(56) References Cited

U.S. PATENT DOCUMENTS

2003/0219037 A1* 11/2003 Toskala ............... H04W 28/22
                                                                370/496
2011/0103290 A1*  5/2011 Suzuki ................. H04L 5/0023
                                                                370/312
(Continued)

FOREIGN PATENT DOCUMENTS

EP              2811795 A1    12/2014
WO        2013/137795 A1     9/2013

OTHER PUBLICATIONS

Aug. 24, 2015—(WO) International Search Report and Written Opinion of the ISA—App PCT/EP2014/077349.
(Continued)

*Primary Examiner* — John J Lee
(74) *Attorney, Agent, or Firm* — Banner & Witcoff, Ltd.

(57) ABSTRACT

A method manages sub-frame data transmission in a cellular network including a macro node and at least one small node associated therewith. The method includes at a macro node side: based on channel quality information from user equipment associated with the macro node, grouping the user equipment into a first group that can be served at a macro node first transmission power and a second group that has to be served at a macro node second transmission power higher than the macro node first transmission power, and determining a sub-frames pattern including: a number of no-transmission sub-frames wherein data transmission is prevented at the macro node side, a number of limited-transmission sub-frames wherein data transmission is allowed at the macro node side at only the first transmission power, and a number of normal-transmission sub frames wherein data transmission is allowed at the macro node side at the second transmission power.

13 Claims, 3 Drawing Sheets

Figure 1:
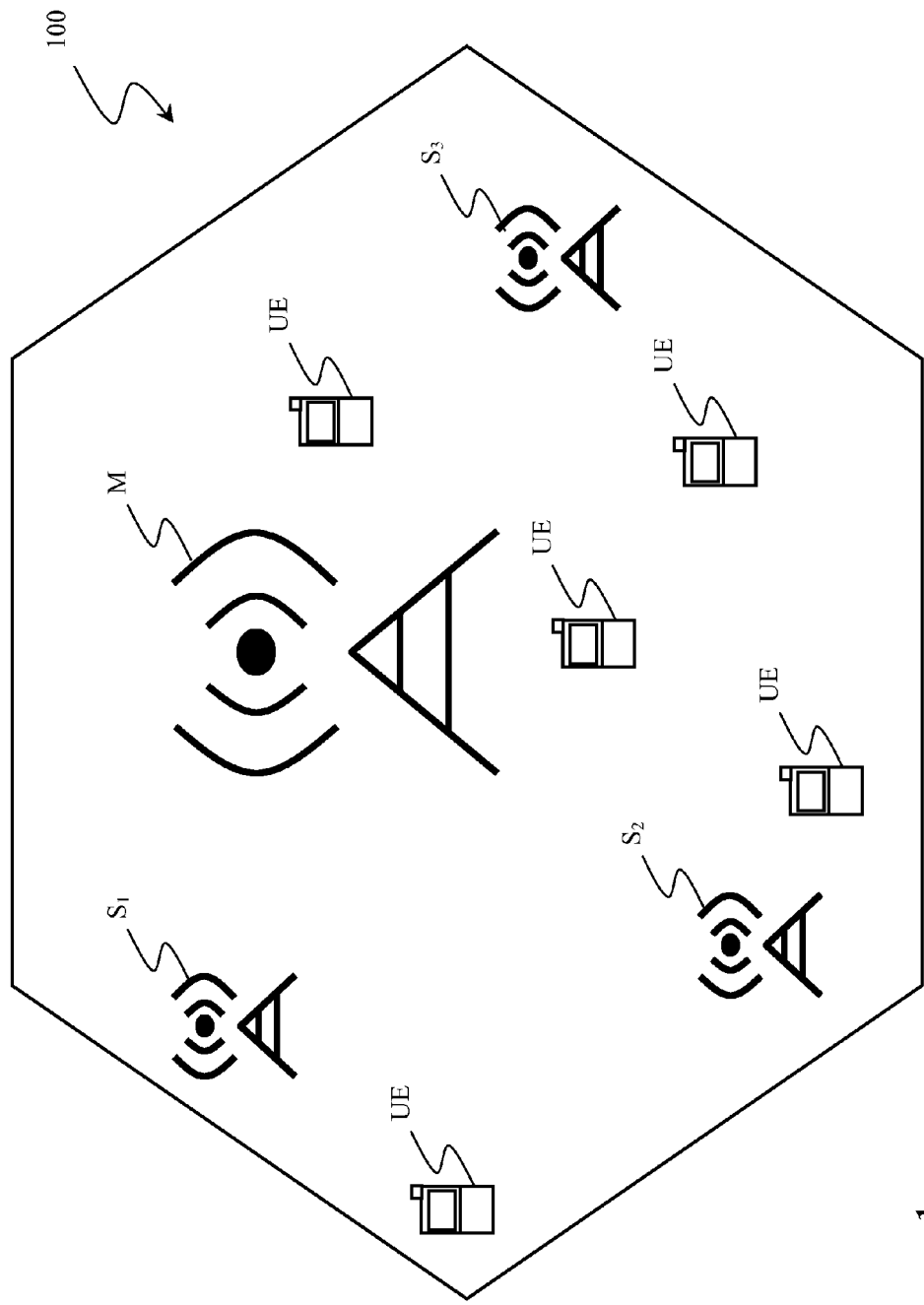

(51) Int. Cl.
H04W 84/04 (2009.01)
H04W 52/14 (2009.01)

(58) Field of Classification Search
USPC ........ 455/522, 69, 67.13, 452.2, 452.1, 453, 455/501, 63.1, 446
See application file for complete search history.

(56) References Cited

U.S. PATENT DOCUMENTS

| | | | |
|---|---|---|---|
| 2013/0107798 A1 | 5/2013 | Gao et al. | |
| 2013/0322235 A1* | 12/2013 | Khoryaev | H04W 24/10 370/229 |
| 2014/0254537 A1 | 9/2014 | Kim et al. | |
| 2016/0242063 A1* | 8/2016 | Tercero Vargas | H04W 16/14 |

OTHER PUBLICATIONS

Shaoyi Xu; Jing Han; Tao Chen, "Enhanced Inter-Cell Interference Coordination in Heterogeneous Networks for LTE-Advanced", Vehicular Technology Conference (VTC Spring), 2012 IEEE 75th, May 6-9, 2012.

Al-Rawi, M.; Simsek, M.; Jantti, R., "Utility-based resource allocation in LTE-Advanced heterogeneous networks" Wireless Communications and Mobile Computing Conference (IWCMC), 2013 9th International, Jul. 1-5, 2013.

Kshatriya, S.N.S.; Kaimalettu, S.; Yerrapareddy, S.R.; Milleth, K.; Akhtar, N., "On interference management based on subframe blanking in Heterogeneous LTE networks" Communication Systems and Networks (COMSNETS), 2013 Fifth International Conference on, Jan. 2013.

Jiyong Pang; Jun Wang; Dongyao Wang; Gang Shen; Qi Jiang; Jianguo Liu, "Optimized time-domain resource partitioning for enhanced inter-cell interference coordination in heterogeneous networks" Wireless Communications and Networking Conference (WCNC), 2012 IEEE, Apr. 1-4, 2012.

Deb, S.; Monogioudis, P.; Miernik, J.; Seymour, J.P., "Algorithms for Enhanced Inter-Cell Interference Coordination (eICIC) in LTE HetNets" Networking, IEEE/ACM Transactions on Networking (vol. 22, Issue: 1, Feb. 2014).

* cited by examiner

METHOD FOR MANAGING DATA TRANSMISSION POWER IN MOBILE CELLULAR NETWORKS

BACKGROUND OF THE INVENTION

Field of the Invention

The present invention generally relates to wireless communication networks, such as cellular networks (e.g., 2G, 3G and LTE/LTE-Advanced cellular networks). More particularly, the present invention relates to heterogeneous cellular networks, and to a method for efficiently and dynamically managing data transmission power of macro and small nodes within such cellular networks.

Overview of the Related Art

Cellular networks (e.g., 2G, 3G and LTE/LTE-Advanced cellular networks) allow data traffic (also referred to as traffic load) to be high-speed conveyed between a fixed-location transceiver base station (or node) radiating radio waves over a respective land area (cell) and user equipments (e.g., user terminals, such as cellular phones) within the cell.

Cellular networks have experimented a significant growth in terms of spread and performance, and have recently evolved into heterogeneous cellular networks. Specifically, each heterogeneous cellular network comprises both relatively high-power and wide-coverage nodes (hereinafter, macro nodes), identifying so-called macro cells, and a number of lower-power, smaller-coverage nodes (hereinafter, secondary or small nodes, e.g. micro, pico, femto nodes) identifying small cells within the macro cells for enhancing overall coverage and capacity.

However, due to the growing number of cellular network users and to the growing demand for services requiring very high traffic load (such as multimedia and real-time services) and very demanding "Quality of Service", multiple small nodes are typically deployed within each macro cell, in indoor and outdoor locations and anywhere high capacity is needed.

Thus, compared to traditional homogeneous cellular networks, which are based on macro nodes of comparable power and coverage, in heterogeneous cellular networks high density small nodes may also be deployed without full planning or even in entirely uncoordinated manner.

As known, this can sharpen power consumption and interference issues.

Indeed, the user equipments that are served by the small nodes they are associated with suffer severe interference from the macro node due to their high transmission powers, and the user equipments that are served by the macro nodes they are associated with suffer severe interference from close small nodes.

In order to better manage cellular network performance, by optimizing power consumption and reducing interference, solutions are known aimed at properly coordinating data transmission at macro and small node sides.

In Shaoyi Xu; Jing Han; Tao Chen, "*Enhanced Inter-Cell Interference Coordination in Heterogeneous Networks for LTE-Advanced*", Vehicular Technology Conference (VTC Spring), 2012 IEEE 75th, 6-9 May 2012, a system is proposed that coordinates N macro nodes and one pico node. Macro node users measure and report N CQIs, pico node users measure and report (N+1) CQIs. Each CQI is obtained by muting all other nodes. Performance for each of the N*(N+1) configurations is evaluated and reported to a central controller, which selects the best configuration. The chosen configuration will alternate, at a configurable rate, with the configuration with all macro nodes on.

In Al-Rawi, M.; Simsek, M.; Jantti, R., "*Utility-based resource allocation in LTE-Advanced heterogeneous networks*" Wireless Communications and Mobile Computing Conference (IWCMC), 2013 9th International, 1-5 Jul. 2013, a method is proposed that evaluates jointly the rate of "Almost Blank Sub-frames" (ABS) and the Cell Range Expansion, knowing the cell-edge throughput values for the macro and micro nodes.

In Kshatriya, S. N. S.; Kaimalettu, S.; Yerrapareddy, S. R.; Milleth, K.; Akhtar, N., "*On interference management based on subframe blanking in Heterogeneous LTE networks*" Communication Systems and Networks (COMSNETS), 2013 Fifth International Conference on, January 2013, a scheme based on almost blank sub-frames (ABS) defined in LTE-A and Inter-cell interference coordination (ICIC) is proposed to overcome interference experienced by victim user equipments and caused by aggressors nodes. The proposed scheme provides for blanking certain sub-frames of a node, which has potential to create severe interference to the user equipments associated with other nodes. The proposed scheme determines the number and location of sub-frames that are to be blanked at each aggressor node.

In Jiyong Pang; Jun Wang; Dongyao Wang; Gang Shen; Qi Jiang; Jianguo Liu, "*Optimized time-domain resource partitioning for enhanced inter-cell interference coordination in heterogeneous networks*" Wireless Communications and Networking Conference (WCNC), 2012 IEEE, 1-4 Apr. 2012, an optimal amount of ABS for synchronous ABS configuration is proposed by formulating optimization as a network-wide utility maximization problem. Firstly, a distributed method to determine victim user equipments protected by ABS for any given amount of ABS via dynamic programming is performed, and then the optimal amount of ABS is found by evaluating overall system utility.

In Deb, S.; Monogioudis, P.; Miernik, J.; Seymour, J. P., "*Algorithms for Enhanced Inter-Cell Interference Coordination (eICIC) in LTE HetNets*" Networking, IEEE/ACM Transactions on Networking (Volume: 22, Issue: 1, February 2014), an algorithm is proposed to solve, in a joint manner, the determination of the amount of radio resources that macro nodes should offer to pico nodes, and determination of the association rules that decide which user equipments should associate with pico nodes. The proposed algorithm accounts for network topology, traffic load, and macro node-pico node interference map, and can be implemented by using the notion of Almost Blank Subframes (ABS) and Cell Selection Bias (CSB) proposed by LTE standards.

In US20130107798, "ABS-based Method for Inter Cell Interference Coordination in LTE-Advanced Networks", systems and methods are disclosed that attempt to provide a solution to the interference coordination problem between macro base stations and pico user equipments. Specifically, the systems and methods conduct interference coordination based on the concept of almost blank sub-frame (ABS), which is supported by the LTE-A standard. The macro base stations choose their ABS configurations in a cooperative way such that the overall system throughput is optimized.

SUMMARY OF INVENTION

The Applicant has recognized that none of the cited prior art solutions is satisfactory.

Indeed, all the above-cited solutions are based on the common approach of reducing interference to the user equipments associated with the small nodes by allowing the macro node to totally mute during certain sub-frames, called "Almost Blank Sub-frames" (hereinafter, ABS sub-frames), and by allowing the small nodes to transmit to the user equipments associated therewith during the ABS sub-frames only.

The Applicant has found that total muting of the macro node during ABS sub-frames does not provide optimal power consumption, as frequent macro and small nodes activations/deactivations are required (especially when a relatively high number of user equipments should be served at macro and small nodes sides). Frequent macro and small nodes activations/deactivations may have a negative impact on parameters such as longevity of the cellular network apparatus, and hence on maintenance costs.

Moreover, such solutions are not adapted to manage extremely dynamic conditions caused by high density of small nodes, due to latencies (e.g., caused by long processing times).

Last but not least, most of the prior-art solutions require defining sets of new, non-standard messages, which makes the corresponding cellular network difficult to implement.

In view of the above, the Applicant has tackled the problem of efficiently reducing power consumption and interference (while increasing satisfaction in terms of exchanged data traffic) of heterogeneous cellular networks, and, in order to achieve that, has devised a solution capable of dynamically managing data transmission on a sub-frame basis based on the possibility of transmitting at low transmission power at macro node side during the ABS sub-frames and at a small node side during non-ABS sub-frames, and on current and historic traffic load conditions at both macro and small nodes sides.

One or more aspects of the present invention are set out in the independent claims, with advantageous features are indicated in the dependent claims.

More specifically, an aspect of the present invention relates to a method for managing, in a cellular network comprising a macro node and at least one small node associated therewith, data transmission on a sub-frame basis. The method comprises, at macro node side:

based on channel quality information from user equipments associated with the macro node, grouping said user equipments into a first group of user equipments that can be served at a macro node first transmission power and a second group of user equipments that have to be served at a macro node second transmission power higher than the macro node first transmission power, determining a sub-frames pattern comprising
 a number of no-transmission sub-frames wherein data transmission is prevented at the macro node side,
 a number of limited-transmission sub-frames wherein data transmission is allowed at the macro node side at only the macro node first transmission power, and
 a number of normal-transmission sub-frames wherein data transmission is allowed at the macro node side at the macro node second transmission power,
said determining being based on power consumptions of the macro node, on data traffic associated with the macro node, and on minimum numbers of no-transmission and limited-transmission sub-frames requested by the at least one small node according to data traffic and interference conditions thereof, and serving user equipments of said first and second groups of user equipments associated with the macro node according to the sub-frames pattern.

According to an embodiment of the present invention, the method further comprises, at each small node side:

based on channel quality information from user equipments associated with the small node, grouping said user equipments into a first group of user equipments that can be served at a small node first transmission power and a second group of user equipments that have to be served at a small node second transmission power higher than the small node first transmission power, determining, among the no-transmission, limited-transmission and normal-transmission sub-frames, preferred sub-frames at which data transmission at a small node side is allowed, said determining being based on power consumptions of the small node, on data traffic associated with the small node and to said interference conditions thereof, and serving user equipments of said first and second groups of user equipments associated with the small node according to said preferred sub-frames.

According to an embodiment of the present invention, at least one between said grouping at macro node side and said grouping at each small node side is based on a distance relationship between the macro and small nodes, respectively, and the associated user equipments.

According to an embodiment of the present invention, the method further comprises, at the macro node side, providing a first parameter indicative of data transmission rate worsening affecting the macro node when transmitting at the macro node first transmission power during a limited-transmission sub-frame rather than at the macro node second transmission power during a normal-transmission sub-frame, said determining at the macro node side being also based on said first parameter.

According to an embodiment of the present invention, the method further comprises, at the small node side, providing a second parameter indicative of data transmission rate worsening that affects the small node when the macro node transmits at the macro node first transmission power during a limited-transmission sub-frame rather than when the small node transmits at the small node second transmission power during a no-transmission sub-frame, and a third parameter indicative of data transmission rate worsening that affects the small node when transmitting at the small node first transmission power during a normal transmission sub-frame rather than at the small node second transmission power during a no-transmission sub-frame, said determining at the small node side being also based on said second and third parameters.

According to an embodiment of the present invention, the method further comprises, at each small node side:

providing to the macro node a number of usable limited-transmission sub-frames wherein, during a previous data transmission, interference perceived by the user equipments associated with the small node and caused by the macro node was below a predefined threshold.

According to an embodiment of the present invention, the method further comprises,
 at each small node side:
 providing to the macro node a percentage of resources allocated by the small node for data transmission in said usable limited-transmission sub-frames, and
 at macro node side:
 calculating said minimum numbers of no-transmission and limited-transmission sub-frames requested by the at least one small node according to said number of usable limited-transmission sub-frames and to said percentage of allocated resources.

According to an embodiment of the present invention, said no-transmission and limited transmission sub-frames define almost blank sub-frames of the sub-frames pattern, said calculating comprising:

for each small node
calculating a number of almost blank sub-frames requested by the small node as the product between the number of usable limited-transmission sub-frames and said percentage of allocated resources if said percentage is lower than 100%, or as the number of usable limited-transmission sub-frames increased by a predefined amount otherwise, and
setting a number of limited-transmission sub-frames requested by the small node and a number of no-transmission sub-frames requested by the small node at 0 and at said number of almost blank sub-frames requested by the small node, respectively, if the number of usable sub-frames differs from the number of almost blank sub-frames configured in the previous sub-frame pattern, or, otherwise, at said number of almost blank sub-frames requested by the small node and 0, respectively, and
calculating the minimum number of no-transmission sub-frames requested by the at least one small node as the maximum among said numbers of no-transmission sub-frames requested by each small node, and the minimum number of limited-transmission sub-frames requested by the at least one small node according to a difference between the maximum among said number of limited-transmission sub-frames requested by each small node and said minimum number of no-transmission sub-frames requested by the at least one small node.

According to an embodiment of the present invention, said determining comprises, if there are enough usable resources:

if normal transmission sub-frames are preferable from power consumption standpoint, determining the number of normal transmission sub-frames as the number of required sub-frames for the user equipments belonging to both said first and second groups of user equipments, or
if normal transmission sub-frames are not preferable from power consumption standpoint
determining the number of normal transmission sub-frames as the number of required sub-frames for only the user equipments belonging to said second group of user equipments, and
determining the number of limited-transmission sub-frames according to the number of required sub-frames for the user equipments belonging to said first group of user equipments, to the number of required sub-frames to clear the load, and to said number of usable limited-transmission sub-frames in the sub-frame pattern.

According to an embodiment of the present invention, said determining comprises:

if there are not enough usable resources, determining the number of limited-transmission sub-frames and the number of normal-transmission sub-frames based on a maximum required number of sub-frames for the user equipments belonging to both said first and second groups of user equipments, and signaling overload.

According to an embodiment of the present invention, the method further comprises calculating a first power consumption representing the power consumed to transmit, during a normal transmission sub-frame, the amount of data that can be transmitted with a resource in a no-transmission sub-frame, and a second power consumption representing the power consumed to transmit, during a limited-transmission sub-frame, the amount of data that can be transmitted with a resource in a no-transmission sub-frame. Said no-transmission and limited transmission sub-frames define almost blank sub-frames, and said determining at a small node side comprises:

if the power consumption of the small node during almost blank sub-frames is between said first and second power consumptions, defining the normal-transmission sub-frames as the preferred sub-frames, or
if said second power consumption is between the power consumption of the small node during almost blank sub-frames and the first power consumption, defining the no-transmission sub-frames as the preferred sub-frames, or
if the first power consumption is between the power consumption of the small node during almost blank sub-frames and the second power consumption, defining the no-transmission sub-frames as the preferred sub-frames.

Another aspect of the present invention relates to a computer program product for implementing said method.

A further aspect of the present invention, relates to a macro node for use in a cellular network. The macro node is configured for:

based on channel quality information from user equipments associated with the macro node, grouping said user equipments into a first group of user equipments that can be served at a macro node first transmission power and a second group of user equipments that have to be served at a macro node second transmission power higher than the macro node first transmission power,
determining a sub-frames pattern comprising
a number of no-transmission sub-frames wherein data transmission is prevented at the macro node side,
a number of limited-transmission sub-frames wherein data transmission is allowed at the macro node side at only the macro node first transmission power, and
a number of normal-transmission sub-frames wherein data transmission is allowed at the macro node side at the macro node second transmission power,
said determining being based on power consumptions of the macro node, on data traffic associated with the macro node, and on minimum numbers of no-transmission and limited-transmission sub-frames requested by at least one small node associated with the macro node according to data traffic and interference conditions of the at least one small node, and
serving user equipments of said first and second groups of user equipments associated with the macro node according to the sub-frames pattern.

A still further aspect of the present invention relates to a small node for use in a cellular network. The small node is configured for:

based on channel quality information from user equipments associated with the small node, grouping said user equipments into a first group of user equipments that can be served at a small node first transmission power and a second group of user equipments that have to be served at a small node second transmission power higher than the small node first transmission power,
receiving from a macro node a sub-frames pattern comprising
a number of no-transmission sub-frames wherein data transmission is prevented at the macro node side,
a number of limited-transmission sub-frames wherein data transmission is allowed at the macro node side at only the macro node first transmission power, and a number of normal-transmission sub-frames wherein data transmission is allowed at the macro node side at the macro node second transmission power, determining, among the no-transmission, limited-transmission and normal-transmission sub-frames, preferred sub-frames at which data transmission at a small node side is allowed, said determining being based on power consumptions of the small node, on data traffic associated with the small node and to said interference conditions thereof, and serving user equipments of said first and second groups of user equipments associated with the small node according to said preferred sub-frames.

The present invention allows dynamically managing data transmission at both macro and small nodes sides for reducing power consumption and interference, while meeting traffic load satisfaction, within heterogeneous cellular networks.

Moreover, the present invention, as requiring low processing times, is adapted to be used in large-scale heterogeneous scenarios having a large number of macro and small nodes and a large number of users equipments.

BRIEF DESCRIPTION OF THE ANNEXED DRAWINGS

Figure 2:
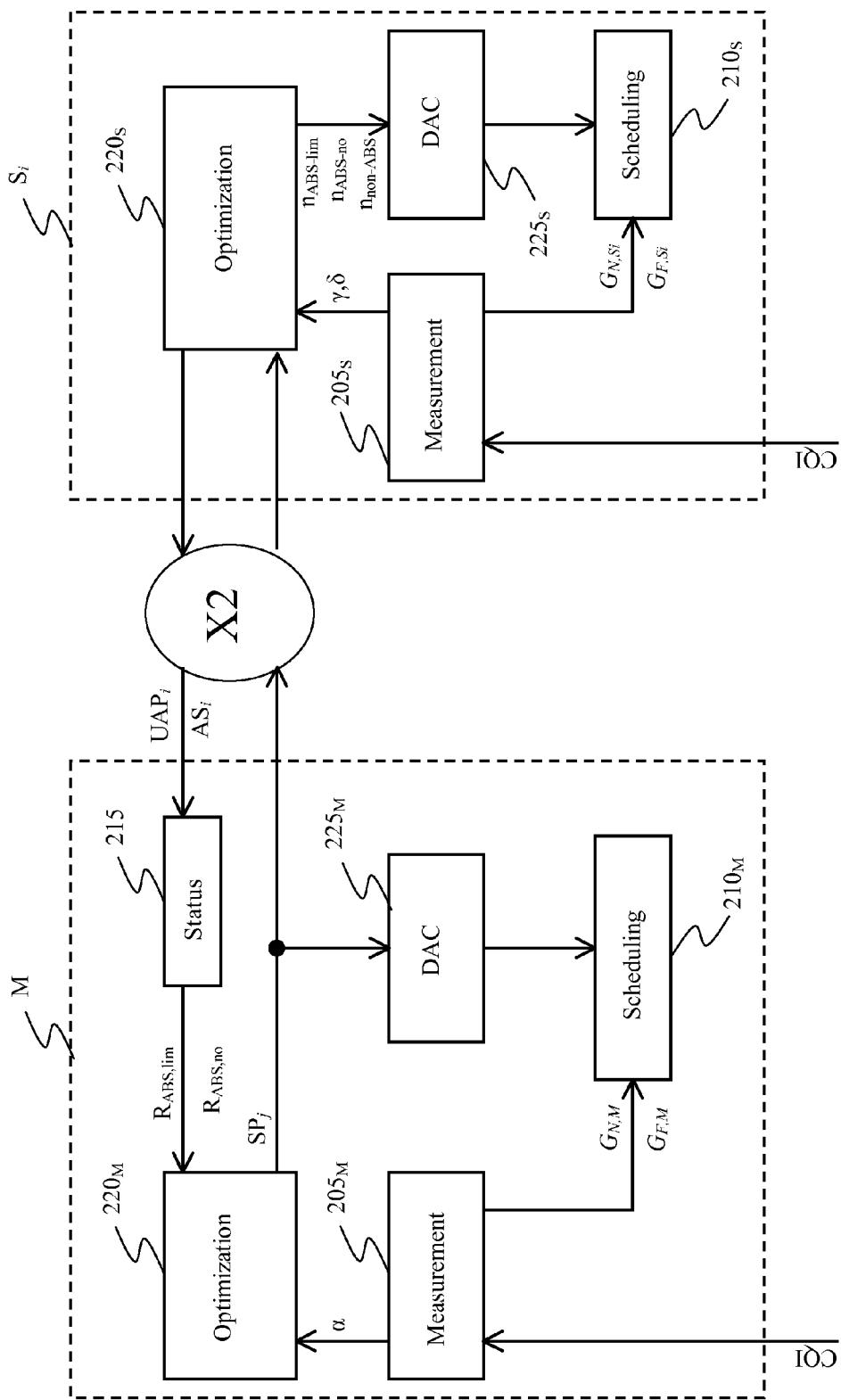
Figure 3:
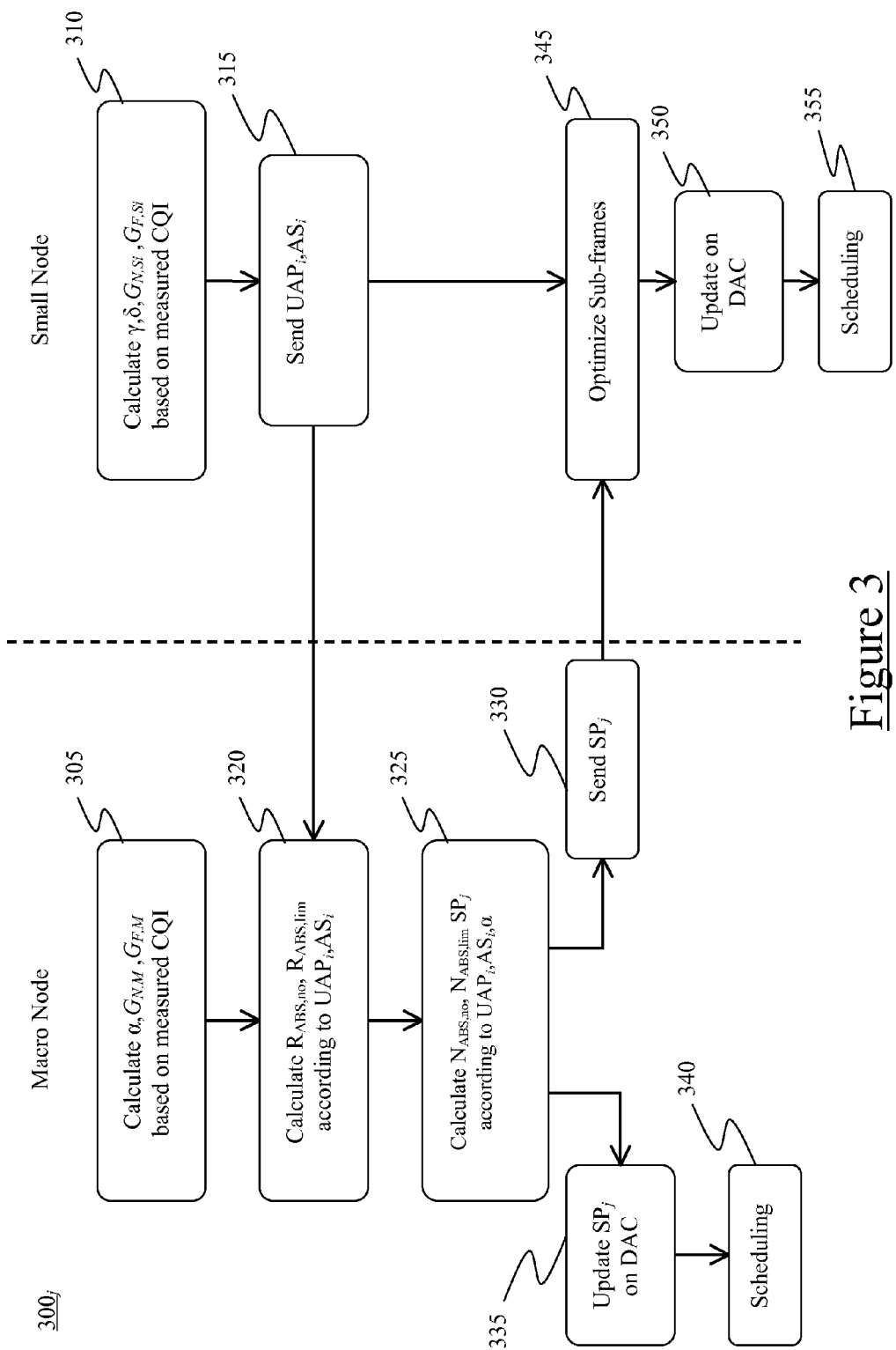

These and other features and advantages of the present invention will be made apparent by the following description of some exemplary and non limitative embodiments thereof. For its better intelligibility, the following description should be read making reference to the attached drawings, wherein:

FIG. 1 schematically shows a portion of a cellular network wherein the present invention may be applied;

FIG. 2 schematically shows macro and small nodes operative modules according to an embodiment of the present invention, and FIG. 3 shows a swim-lane activity diagram illustrating, by both macro and small nodes sides, the operations flow taking place at said operative modules according to an embodiment of the present invention.

DETAILED DESCRIPTION OF PREFERRED EMBODIMENTS OF THE INVENTION

With reference to the drawings, a portion of a cellular network 100 according to an embodiment of the present invention is schematically illustrated in FIG. 1.

The cellular network 100 (e.g., compliant with the 3GPP LTE/LTE-Advanced standard) comprises a number of relatively high-power and wide-coverage transceiver stations (hereinafter, macro nodes), such as the macro node M, each one configured to provide radio coverage over a relatively wide geographic area (also referred to as macro cell, e.g., hexagonal in shape), and within (i.e. pertaining to/handled by) the macro cell, a number I of lower-power, smaller coverage nodes (e.g., pico, micro, and/or femto nodes), in the following referred to as small nodes $S_i$ (i=1, 2, ... I, with I=3 in the example at issue), each one identifying a respective small cell for increasing cellular network 100 capacity.

The cellular network 100 is configured to allow user equipments (e.g., mobile phones) within (i.e., associated with) the respective macro or small cells, such as the user equipments UE, to exchange data traffic (e.g., web browsing, e-mailing, voice, or multimedia data traffic). Hereinafter, only downlink communication (i.e., from the macro M or small $S_i$ nodes to the associated user equipments UE) is considered, which the present invention is mainly addressed to.

For the sake of completeness, as well known by those having ordinary skill in the art, the macro M and small $S_i$ nodes form the radio access network. In turn, the radio access network is generally communicably coupled with one or more core networks (not shown), which may be coupled with other networks, such as the Internet and/or public switched telephone networks (not illustrated).

Broadly speaking, the macro M and small $S_i$ nodes according to the present invention are configured to carry out a configuring procedure providing effective sub-frames configuration, i.e. effective configuration of the transmission powers at which the user equipments UE should be served (by the macro M or small $S_i$ nodes they are associated with) for data transmission taking place (over a predefined time length 7) after the configuring procedure. According to 3GPP LTE/LTE-Advanced standard, data transmission takes place on a sub-frame basis, each sub-frame having a time length of a 1 ms "Transmission Time Interval" (TTI) and comprising a number of resources (i.e., "Physical Resources Blocks", or PRB) depending on bandwidth allocation and PRBs availability.

The proposed invention makes use of the possibility, provided by the 3GPP LTE/LTE-Advanced standard, of carrying out data transmission at macro M and small $S_i$ nodes sides at respective high transmission powers (hereinafter referred to as macro node high transmission power and small node high transmission power, respectively) or at respective low transmission powers (hereinafter referred to as macro node low transmission power and small node low transmission power, respectively). This possibility is independent from actual setting of the transmission powers (which may also depend on specific design parameters of the cellular network 100 and/or of the macro M and small $S_i$ nodes). By way of example only, the macro node and small node high transmission powers may be set at 40 W ($\approx$46 dBm) and 1 W ($\approx$30 dBm), respectively, whereas the macro node and small node low transmission powers may be set at 1 W ($\approx$30 dBm) and 0.025 W ($\approx$14 dBm), respectively.

Macro M and small $S_i$ nodes operative modules according to an embodiment of the present invention are schematically shown in FIG. 2. As a preliminary consideration, it is pointed out that the use of the term "module" is herein intended to emphasize functional (rather than implementation) aspects thereof. Indeed, without losing of generality, each module may be implemented by software (in which case, the resulting algorithm would be performed by proper software code means included in a computer program product, directly loadable into a memory of a computer, when the program is run on a computer), hardware, and/or a combination thereof.

For the sake of description ease, FIG. 2 will be discussed together with FIG. 3, which shows a swim-lane activity diagram illustrating, by both macro M and small $S_i$ nodes sides, and by logical and chronological viewpoints, the operations flow taking place at said operative modules during each j-th configuring procedure $300_j$.

Basically, during each j-th configuring procedure $300_j$, a sub-frames pattern $SP_j$ of N=T/TTI sub-frames is configured and exploited for optimized data transmission at macro M and small $S_i$ nodes sides. In the following, for the sake of description ease, data transmission following the j-th configuring procedure $300_j$ will be also referred to as j-th data transmission.

Each sub-frame may be configured (by the macro node M) to be either an "Almost Blank Sub-frame" (hereinafter, ABS sub-frame) or a non "Almost Blank Sub-frame" (hereinafter, non-ABS sub-frame). Each ABS sub-frame may in turn be configured to be a no-transmission ABS sub-frame (wherein data transmission at the macro node M is prevented), or a limited-transmission ABS sub-frame (wherein data transmission at the macro node M is limited to some user equipments only and to low transmission power only). During each non-ABS sub-frame, instead, data transmission at high transmission power takes place at the macro node M (thus, also referred to as normal sub-frame). As will be understood in the following, unlike the prior-art solutions, which are based on preventing data transmission at small nodes $S_i$ side during non-ABS sub-frames (i.e., when data transmission at macro node M side takes place at macro node high transmission power), the proposed invention allows that if energetically more convenient. Moreover, by exploiting the possibility of defining, among the ABS sub-frames, no-transmission and limited transmission ABS sub-frames, simultaneous data transmission at both macro M and small $S_i$ nodes side can be achieved with a tolerable interference.

For the purposes of the present invention, the sub-frames pattern $SP_j$ specifies both whether a sub-frame is an ABS sub-frame or a non-ABS sub-frame (e.g., by exploiting "ABS pattern" (AP) messages already provided by the 3GPP LTE/LTE-Advanced standard), and whether an ABS-sub-frame is a limited-transmission or a no-transmission ABS sub-frame (e.g., by exploiting "Measurement Subset" (MS) messages already provided by the 3GPP LTE/LTE-Advanced standard).

The macro M and small $S_i$ nodes comprise respective measuring modules $205_M$ and $205_S$, each one configured to receive, at the start of each configuring procedure $300_j$ (steps 305,310), information/reports relating a channel quality perceived/measured by the user equipments UE associated, respectively, with the macro $M_i$ and small $S_i$ nodes (e.g., a "Channel Quality Indicator", or CQI) during the (j−1)-th data transmission.

Based on said CQI reports, the measuring module $205_M$ is configured to provide (to a scheduling module $210_M$ of the macro node M) a group/list of user equipments UE, among the user equipments UE associated with the macro node M, that could be served by the macro node M at the macro node low transmission power (i.e. a group of user equipments UE that, by the logical viewpoint, are "near" the macro node M they are associated with, thus referred to as near user equipments group $G_{N,M}$) and a group/list of user equipments UE that have to be served by the macro node M at the macro node high transmission power (i.e. a group of user equipments UE that, by the logical viewpoint, are "far" from the macro node M they are associated with, thus referred to as far user equipments group $G_{F,M}$ hereinafter).

Similarly, based on said CQI reports, the measuring module $205_S$ of each small node $S_i$ is configured to provide (to a scheduling module $210_S$ of the respective small node $S_i$) a near user equipments group $G_{N,Si}$ comprising a group/list of user equipments UE, among the user equipments associated with the small node $S_i$, that could be served by the small node $S_i$ at the small node low-power transmission mode, and a far user equipments group $G_{F,Si}$ comprising a group/list of user equipments UE, among the user equipments UE associated with the small node $S_i$, that have to be served by the small node $S_i$ at the small node high transmission power.

Without losing of generality, provision of the near $G_{N,M}$, $G_{N,Si}$ and far $G_{F,M}$, $G_{F,Si}$ user equipments groups may further be based on other suitable criteria, such as distance relationship between the macro M and small $S_i$ nodes and the associated user equipments UE. For example, according to an embodiment, the near user equipments groups $G_{N,M}$, $G_{N,Si}$ may comprise all user equipments UE whose associated CQI is higher than a pre-defined CQI threshold.

The measuring module $205_M$ is also configured to compute a parameter α indicative of data transmission rate worsening that affects the macro node M when transmitting at the macro node low transmission power during a limited-transmission ABS sub-frame rather than at the macro node high transmission power during a non-ABS sub-frame—indeed, during the non-ABS sub-frames, the macro node M experiences low (or negligible) interference, and hence the data transmission rate is substantially the highest possible. According to an embodiment, the parameter α is computed as the ratio between the average number of bytes per PRB during a limited-transmission ABS sub-frame and the average number of bytes per PRB during a non-ABS sub-frame.

The measuring module $205_S$ is also configured to provide a parameter δ indicative of data transmission rate worsening that affects the small node $S_i$ when the macro node M transmits at the macro node low transmission power during a limited-transmission ABS sub-frame rather than when the small node $S_i$ transmits at the small node high transmission power during a no-transmission ABS sub-frame—indeed, during the no-transmission ABS sub-frames, the small node $S_i$ experiences low (or negligible) interference, and hence the data transmission rate is substantially the highest possible—as well as a parameter γ indicative of data transmission rate worsening that affects the small node $S_i$ when transmitting at the small node low transmission power during a non-ABS sub-frame rather than at the small node high transmission power during a no-transmission ABS sub-frame. According to an embodiment, the parameter δ is computed as the ratio between the average number of bytes per PRB during a limited-transmission ABS sub-frame and the average number of bytes per PRB during a no-transmission ABS sub-frame, and the parameter γ is computed as the ratio between the average number of bytes per PRB during a non-ABS sub-frame and the average number of bytes per PRB during a no-transmission ABS sub-frame. As better discussed in the following, the parameters α and δ, γ will be used for carrying out optimization processes at macro M and small $S_i$ nodes sides. According to an embodiment, the number of bytes per PRB during limited-transmission and no-transmission ABS sub-frames and during non-ABS sub-frames is determined based on the CQI reported by the user equipments UE.

From the foregoing, it should be apparent that, for the j-th configuring procedure $300_j$, the average number of bytes per PRB during ABS and non-ABS sub-frames, the average number of bytes per PRB during a no-transmission ABS sub-frame, and the average number of bytes per PRB during a limited-transmission ABS sub-frame relate to the (j−1)-th data transmission.

As illustrated, each small node $S_i$ is configured to provide (step 315) to a status module 215 of the macro node M (e.g., through a X2 interface):

a number $UAP_i$ (e.g., derived from the "Usable ABS Pattern" message provided by the 3GPP LTE/LTE-Advanced standard) of limited-transmission ABS sub-frames of the sub-frame pattern $SP_{(j-1)}$ wherein, during the (j−1)-th data transmission, the interference generated by the macro node M is tolerable, in terms of power consumption efficiency, for the user equipments UE (associated with the i-th small node $S_i$) that, during the (j−1)-th data transmission, have received over the same limited-transmission ABS sub-frames. According to an embodiment, the interference generated by the macro node M is deemed tolerable as long as the parameter δ is lower than a predefined threshold. As $UAP_i$ represents the number of ABS sub-frames usable for the (current, i.e. under configuration) sub-frame pattern $SP_j$ (of the current j-th configuring procedure), it will be also referred to as number of usable ABS sub-frames for the sake of conciseness; and the percentage $AS_i$ ("ABS Status") of PRBs scheduled by the i-th small node $S_i$ for data transmission in said usable sub-frames, Based on $UAP_i$ and $AS_i$, the status module 215 is configured to provide (step 320):

a minimum number $R_{ABS\text{-}lim}$ of limited-transmission ABS sub-frames requested by the small nodes $S_i$ (i.e., the number of ABS sub-frames wherein the macro node M is requested to provide data transmission at the macro node low transmission power), and a minimum number $R_{ABS\text{-}no}$ of no-transmission ABS sub-frames requested by the small nodes $S_i$ (i.e., the number of ABS sub-frames wherein the macro node M is requested to avoid data transmission).

In order obtain $R_{ABS\text{-}lim}$ and $R_{ABS\text{-}no}$, the status module 215 preferably performs the following operations:

a) For each i-th small node $S_i$, a number $R_{ABSi}$ of ABS sub-frames (whether limited transmission or no-transmission ABS sub-frames) requested by the small nodes $S_i$ is first calculated as follows:

if $AS_i < 100\%, R_{ABSi} = UAP_i * AS_i$ if $AS_i = 100\%, R_{ABSi} = UAP_i + \Delta UAP$ In other words, if the percentage $AS_i$ of scheduled PRBs is lower than 100%, $R_{ABSi}$ is set at the number of ABS sub-frames strictly requested by the i-th small node $S_i$ (i.e. the number $UAP_i$ of usable ABS sub-frames reduced by virtue of the percentage $AS_i$) whereas if the percentage $AS_i$ of scheduled PRBs is equal to 100% (i.e., the i-th small node $S_i$ is in overload condition), $R_{ABSi}$ is set at a number of ABS sub-frames higher than the number $UAP_i$ of usable ABS sub-frames (e.g., by a predefined amount $\Delta UAP$—for example, $\Delta UAP=1$).

b) The number $UAP_i$ of usable ABS sub-frames from the i-th small node $S_i$ is compared with the most recent sub-frame pattern sent to the small nodes $S_i$ (i.e., the sub-frames pattern $SP_{(j-1)}$). If the number $UAP_i$ of usable ABS sub-frames from the i-th small node $S_i$ differs from the number of ABS sub-frames configured in the most recent sub-frame pattern, the interference is not tolerable for the i-th small node $S_i$, hence the number of limited-transmission ABS sub-frames requested by the i-th small node $S_i$ (referred to as $R_{ABS\text{-}lim,i}$ hereinafter) and the number of no-transmission ABS sub-frames requested by the i-th small node $S_i$ (referred to as $R_{ABS\text{-}no,i}$ hereinafter) are set to 0 and $R_{ABSi}$, respectively, i.e.:

$R_{ABS\text{-}lim,i} = 0$ $R_{ABS\text{-}no,i} = R_{ABSi}$

Otherwise, if the number $UAP_i$ of usable ABS sub-frames from the i-th small node $S_i$ is equal to the number of ABS sub-frames configured in the most recent sub-frame pattern, interference is tolerable, hence the number $R_{ABS\text{-}lim,i}$ of limited-transmission ABS sub-frames requested by the i-th small node $S_i$ and the number $R_{ABS\text{-}no,i}$ of no-transmission ABS sub-frames requested by the i-th small node $S_i$ are set to $R_{ABSi}$ and 0, respectively, i.e.:

$R_{ABS\text{-}lim,i} = R_{ABSi}$ $R_{ABS\text{-}no,i} = 0$ c) The minimum number $R_{ABS\text{-}no}$ of no-transmission ABS sub-frames requested by the small nodes $S_i$ is the maximum among $R_{ABS\text{-}no,i}$, i.e.:

$R_{ABS\text{-}no} = \max[R_{ABS\text{-}no,i}]$ whereas the minimum number $R_{ABS\text{-}lim}$ of limited-transmission ABS sub-frames requested by the small nodes $S_i$ is:

$R_{ABS\text{-}lim} = \min[(\max(R_{ABSi}) - R_{ABS\text{-}no}), 0]$

The macro node $M_i$ also comprises an optimization module 220$_M$ configured to receive the minimum number $R_{ABS\text{-}lim}$ of limited-transmission ABS sub-frames requested by the small nodes $S_i$, the minimum number $R_{ABS\text{-}no}$ of no-transmission ABS sub-frames requested by the small nodes $S_i$, power models related to the macro node M (e.g., a power model for macro node high power transmission, and a power model for macro node low transmission power), and the parameter α, and to provide the sub-frames pattern $SP_j$ (step 325) according to traffic demands (e.g., in terms of number K of PRBs) to the user equipments UE associated with the macro node M, and, whenever possible, traffic demands of the user equipments UE associated with the small nodes $S_i$ (as indicated by $R_{ABS\text{-}lim}$ and $R_{ABS\text{-}no}$), while minimizing power consumption.

Preferably, each power model determines the power consumption as a function of the number of allocated PRBs. In the following, for the sake of ease, reference will be made to a power consumption P per allocated PRB (for a linear power model, P is the constant slope thereof).

Defining by:

$N_{non\text{-}ABS,min}$ the minimum number of non-ABS sub-frames that can be reserved to the macro node M in order to guarantee a minimum service to far user equipments UE, e.g. for latency issues;

$RB_N$ the number of resources (i.e., PRBs) in a sub-frame;

$N_{SP}$ the number of sub-frames in a sub-frames pattern $N_{non\text{-}ABS}$ and $N_{ABS\text{-}lim}$ the number of non-ABS and limited-transmission ABS frames to be configured in the sub-frames pattern $SP_j$;

K and $K_{NEAR}$ the traffic demands (e.g., in terms of number of PRBs) of the user equipments UE associated with the macro node M belonging to the near user equipments group, and $P_{ABS}$ and $P_{non\text{-}ABS}$ the power consumptions per allocated PRB during ABS and non-ABS sub-frames, respectively, the optimization module 220$_M$ operates as follows.

First, the optimization module 220$_M$ checks whether there are not enough usable resources for granting a minimum service to the macro node M, i.e.

$N_{non\text{-}ABS,min} > (N_{SP} - R_{ABS\text{-}no} - R_{ABS\text{-}lim})$; or for serving data traffic requests of the near and far user equipments UE, given that the resources for satisfying the minimum number $R_{ABS\text{-}lim}$ of limited-transmission ABS sub-frames requested by the small nodes $S_i$ for the near user equipments UE are not sufficient, i.e.:

$\{K > [N_{SP} - R_{ABS\text{-}lim} - (1-\alpha) - R_{ABS\text{-}no}] * RB_N\} \{K_{NEAR} > R_{ABS\text{-}lim} * \alpha * RB_N\}$; or for serving data traffic requests of only the far user equipments UE, given that the resources for satisfying the minimum number $R_{ABS\text{-}lim}$ of limited-transmission ABS sub-frames requested by the small nodes $S_i$ for the near user equipments UE have been sufficient, i.e.:

$$\{K-K_{NEAR} > [N_{SP}-R_{ABS\text{-}lim}- R_{ABS\text{-}no}]*RB_N\} \wedge \{K_{NEAR} < R_{ABS\text{-}lim}*\alpha*RB_N\}$$

wherein the symbol ^ denotes the AND logic operator.

If there are not enough usable resources (i.e., if one of the above conditions is verified), the number of limited-transmission sub-frames ($N_{ABS,lim}$) and the number of normal-transmission sub-frames ($N_{non\text{-}ABS}$) is determined based on a maximum required number of sub-frames for near and far user equipments UE, i.e.:

$$N_{ABS\text{-}lim} = \{[K_{NEAR}/(RB_N*\alpha)], R_{ABS\text{-}lim}, (RB_N - N_{non\text{-}ABS,min})\}$$

$$N_{non\text{-}ABS} = \max\{N_{non\text{-}ABS,min}, (N_{SP}-N_{ABS\text{-},lim})-R_{ABS\text{-}no}\}$$

and overload is signaled (in which case, some of the required resources will not be allocated in the current sub-frame pattern $SP_j$).

If, instead, non-ABS sub-frames are preferable from power consumption standpoint, i.e.:

$$P_{non\text{-}ABS} \leq P_{ABS}/\alpha$$

the number $N_{non\text{-}ABS}$ of non-ABS sub-frames is determined as the number of required sub-frames for both the near and far user equipments (UE) (or, otherwise stated, all the non-ABS sub-frames required to carry the entire load of both near and far user equipments UE are allocated), i.e.:

$$N_{non\text{-}ABS} = \max\{N_{non\text{-}ABS,min}, \min[(N_{SP}-R_{ABS\text{-}no}-R_{ABS\text{-}lim}), K/RB_N]\}$$

Otherwise, if non-ABS sub-frames are not preferable from power consumption standpoint, the number $N_{non\text{-}ABS}$ of non-ABS sub-frames is determined as the number of required sub-frames for only the far user equipments UE (non-ABS sub-frames are just enough to carry the load of the far user equipments UE), i.e.:

$$N_{non\text{-}ABS} = \max\{N_{non\text{-}ABS,min}, \min[(N_{SP}-R_{ABS\text{-}no}-R_{ABS\text{-}lim}), (K-K_{NEAR})/RB_N]\}$$

and the number of ABS sub-frames wherein the macro node M is supposed to transmit (namely, $N_{ABS\text{-}lim}$) in order to ensure the minimum-power solution is determined such that the number strictly required for near user equipments, the number required to clear the entire load (given the fact that non-ABS sub-frames may have already been provisioned), and the number of usable sub-frames in the sub-frame pattern $SP_j$ are not exceeded, namely:

$$N_{ABS\text{-}lim} = \max\{0, \min[[K_{NEAR}/(RB_N*\alpha)], [(K-RB_N*N_{non\text{-}ABS})/(RB_N*\alpha)], [(N_{SP}-R_{ABS\text{-}no}-N_{non\text{-}ABS})]\}\}$$

However, the minimum-power solution so determined may not have enough capacity (as the ABS sub-frames are not as capacity-effective as non-ABS ones), i.e.:

$$[RB_N*(\alpha*N_{ABS\text{-}lim}+N_{non\text{-}ABS})] < K$$

In this case (taking place only when $P_{non\text{-}ABS} > P_{ABS}/\alpha$, as the should be readily verified), trade-off between power consumption efficiency and capacity is preferably carried out, and load shifting from ABS sub-frames to non-ABS sub-frames is preferably carried out as follows:

$$\Delta = [K-RB_N*(\alpha*N_{ABS\text{-}lim}+N_{non\text{-}ABS})]/[(1-\alpha)*RB_N]$$

$$N_{ABS\text{-}lim} = N_{ABS\text{-}lim} - \Delta$$

$$N_{non\text{-}ABS} = N_{non\text{-}ABS} + \Delta$$

$N_{ABS\text{-}lim}$ and $N_{non\text{-}ABS}$ are used to determine the sub-frames pattern $SP_j$, thereafter the sub-frames pattern $SP_j$ is communicated to all the small nodes $S_i$ (step 330), e.g. through the X2 interface, and to a "Dynamic Access Controller" (DAC) module $225_M$ (step 335).

According to the sub-frames pattern $SP_j$, the DAC module $225_M$ is configured to communicate to the scheduling module $210_M$, for each sub-frame, which user equipments UE are eligible for data reception (e.g., far user equipments may be served only at macro node high transmission power, whereas near user equipments may be served whichever macro node transmission power). In turn, the scheduling module $210_M$ (according to proper scheduling functions/criteria not limiting for the present invention) is configured to schedule data transmission for the user equipments of the near $G_{N,M}$ or far $G_{F,M}$ user equipments groups.

Similarly to the above, each small node $S_j$ comprises an optimization module $220_S$ configured to receive the sub-frames pattern $SP_j$, power models related to the small node $S_j$ (e.g., a power model for data transmission at small node high transmission power, and a power model for data transmission at small node low transmission power), and the parameters $\gamma, \delta$ from the measuring module $205_S$, and to determine on which sub-frames (of the sub-frames pattern $SP_j$) the user equipments UE associated with the small node $S_i$ are allowed to receive data (step 345).

Defining by:
- $n_{non\text{-}ABS}$, $n_{ABS,lim}$ and $n_{ABS,no}$ the number of non-ABS, limited-transmission and no transmission ABS frames to be configured for the small node $S_i$, respectively, and
- k and $k_{NEAR}$ the traffic demands (e.g., in terms of number of PRBs) to all the user equipments UE associated with the small node $S_i$ and to the user equipments UE associated with the small node $S_i$ belonging to the near user equipments group $G_{N,S}$,
- $\rho_{ABS}$ and $\rho_{non\text{-}ABS}$ the power consumptions per allocated PRB during ABS and non-ABS sub-frames, respectively, for the small node $S_i$, the optimization module $220_S$ operates based on power consumption comparisons, which allow determining the configuration of sub-frames to be used (i.e., which sub-frames, among the limited-transmission ABS sub-frames, the no-transmission ABS sub-frames and the non-ABS sub-frames, should be used and in which order). According to the exemplary considered embodiment, as better detailed hereinbelow, $\rho_{non\text{-}ABS}/\gamma$ and $\rho_{ABS}/\delta$ are used as terms of comparison, wherein:

$1/\gamma$ represents the number of PRBs that should be allocated in a non-ABS sub-frame to obtain the same amount of data obtainable with a PRB in a no-transmission ABS sub-frame, $\rho_{non\text{-}ABS}/\gamma$ thus representing the power consumed to transmit, during a non-ABS sub-frame, the amount of data that can be transmitted with a PRB in a no-transmission ABS sub-frame, and $1/\delta$ represents the number of PRBs that should be allocated in a limited-transmission ABS sub-frame to obtain the same amount of data obtainable with a PRB in a no-transmission ABS sub-frame, $\rho_{ABS}/\delta$ thus representing the power consumed to transmit, during a limited-transmission ABS sub-frame, the amount of data that can be transmitted with a PRB in a no-transmission ABS sub-frame.

Otherwise stated, as $\rho_{non\text{-}ABS}$ and $\rho_{ABS}$ represent respective power models slopes, dividing/weighting $\rho_{non\text{-}ABS}$ and $\rho_{ABS}$ by the parameter $\gamma$ and the parameter $\delta$, respectively, corresponds to increase these slopes.

According to an embodiment, the optimization module $220_S$ operates as follows:

a) If $$\rho_{non\text{-}ABS}/\gamma \leq \rho_{ABS}/\delta$$

the best solution is to exploit non-ABS sub-frames first, and then the no-transmission ABS sub-frames. Limited-transmission ABS sub-frames should only be used as a last resort, i.e.:

$$n_{non\text{-}ABS} = \min\{[K_{NEAR}/(RB_N*\gamma)], N_{non\text{-}ABS}\}$$

$$n_{ABS\text{-}no} = \min\{[K/RB_N - n_{non\text{-}ABS}*\gamma)], N_{ABS\text{-}no}\}$$

$$n_{ABS\text{-}lim} = \min\{[(K - n_{non\text{-}ABS}*RB_N*\gamma - n_{ABS\text{-}no}*RB_N)/(RB_N*\gamma)], N_{ABS\text{-}lim}\}$$

b) If $$\rho_{ABS} \leq \rho_{ABS}/\delta \leq \rho_{non\text{-}ABS}/\gamma$$

the best solution is to exploit no-transmission ABS sub-frames first, and only then the limited-transmission ABS sub-frames. Non-ABS sub-frames should only be used as a last resort, i.e.:

$$n_{ABS\text{-}no} = \min\{[k/RB_N], N_{ABS\text{-}no}\}$$

$$n_{ABS\text{-}lim} = \min\{[(K - n_{ABS\text{-}no}*RB_N)/(RB_N*\delta)], N_{ABS\text{-}lim}\}$$

$$n_{non\text{-}ABS} = \min\{[k/(RB_N - n_{ABS\text{-}lim}*\delta - n_{ABS\text{-}no})], N_{non\text{-}ABS}, [(k_{NEAR})/(RB_N*\gamma)]\}$$

c) If $$\rho_{ABS} \leq \rho_{non\text{-}ABS}/\gamma \leq \rho_{ABS}/\delta$$

the best solution is to exploit no-transmission ABS sub-frames first and the non-ABS sub-frames afterwards. The limited-transmission ABS sub-frames should only be used as a last resort, i.e.:

$$n_{ABS\text{-}no} = \min\{[k/RB_N], N_{ABS\text{-}no}\}$$

$$n_{non\text{-}ABS} = \min\{[(k - n_{ABS\text{-}no}*RB_N)/(RB_N*\gamma)], N_{non\text{-}ABS}, [(k_{NEAR})/(RB_N*\gamma)]\}$$

$$n_{ABS\text{-}lim} = \min\{[(K - n_{ABS\text{-}no}*RB_N - n_{non\text{-}ABS}*RB_N*\gamma)], N_{ABS\text{-}lim}\}$$

In other words, the optimization module $220_S$ is configured to determine, among the no-transmission $N_{ABS,no}$ and limited-transmission $N_{ABS,lim}$ ABS sub-frames and the non-ABS sub-frames $N_{non\text{-}ABS}$ of the sub-frame pattern $SP_j$, preferred sub-frames at which data transmission at a small node ($S_i$) side is energetically convenient.

$n_{ABS\text{-}lim}$, $n_{non\text{-}ABS}$ and $n_{ABS\text{-}no}$ from the optimization module $220_S$ are communicated to the DAC module $225_S$ (step 350). The DAC module $225_S$ is configured to communicate to the scheduling module $210_S$, for each sub-frame, which user equipments UE are eligible for data reception (e.g., far user equipments may be served only at small node high transmission power, whereas near user equipments may be served whichever small node transmission power). In turn, the scheduling module $210_S$ (according to proper scheduling functions/criteria not limiting for the present invention) is configured to schedule data transmission for the user equipments of the near $G_{N,S}$ or far $G_{F,S}$ user equipments groups (step 355).

Thanks to the present invention, dynamic managing of data transmission at both macro M and small $S_i$ nodes sides is achieved and optimized for power consumption and interference reduction. Moreover, the proposed invention makes use of standard messages (exchanged through the X2 interface) already provided by the 3GPP LTE/LTE-A standard, and does not require, as the prior-art solutions instead do, defining sets of new, non-standard messages.

Naturally, in order to satisfy local and specific requirements, a person skilled in the art may apply many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment as a matter of general design choice.

More specifically, the present invention lends itself to be implemented through an equivalent method (by using similar steps, removing some steps being not essential, or adding further optional steps); moreover, the steps may be performed in different order, concurrently or in an interleaved way (at least partly).

In addition, analogous considerations apply if the wireless communication network has a different structure or comprises equivalent components, or it has other operating features. In any case, any component thereof may be separated into several elements, or two or more components may be combined into a single element; in addition, each component may be replicated for supporting the execution of the corresponding operations in parallel. It should also be noted that any interaction between different components generally does not need to be continuous (unless otherwise indicated), and it may be both direct and indirect through one or more intermediaries.

Moreover, although explicit reference has been made to wireless communication network based on the LTE/LTE-Advanced standard, it should be understood that it is not in the intentions of the Applicant to be limited to the implementation of any particular wireless communication system architecture or protocol. In this respect, it is also possible to provide that, with suitable simple modifications, the proposed method for dynamic activation/deactivation of the small nodes may be applied to any other wireless communication network (e.g., 2G and 3G wireless communications networks) featuring deployment heterogeneity.

The invention claimed is:

1. A method for managing, in a cellular network comprising a macro node and at least one small node associated therewith, data transmission on a sub-frame basis, the method comprising, at a macro node side:
 based on channel quality information from user equipment associated with the macro node, grouping the user equipment into a first group of the user equipment configured to be served at a macro node first transmission power and a second group of the user equipment that has to be served at a macro node second transmission power higher than the macro node first transmission power,
 determining a sub-frames pattern comprising
  a number of no-transmission sub-frames wherein data transmission is prevented at the macro node side, a number of limited-transmission sub-frames wherein data transmission is allowed at the macro node side at only the macro node first transmission power, and a number of normal-transmission sub-frames wherein data transmission is allowed at the macro node side at the macro node second transmission power, the determining being based on power consumption of the macro node, on data traffic associated with the macro node, and on minimum numbers of the no-transmission and the limited-transmission sub-frames requested by the at least one small node according to the data traffic and interference conditions thereof, and serving the user equipment of the first and second groups of the user equipment associated with the macro node according to the sub-frames pattern.

2. The method according to claim 1, further comprising, at each small node side:

based on channel quality information from user equipment associated with the small node, grouping the user equipment into a first group of user equipment configured to be served at a small node first transmission power and a second group of user equipment that has to be served at a small node second transmission power higher than the small node first transmission power, determining, among the no-transmission, limited-transmission and normal-transmission sub-frames, preferred sub-frames at which data transmission at a small node side is allowed, the determining being based on power consumption of the small node, on data traffic associated with the small node and to the interference conditions thereof, and serving user equipment of the first and second groups of user equipment associated with the small node according to the preferred sub-frames.

3. The method according to claim 2, wherein at least one between the grouping at a macro node side and the grouping at each small node side is based on a distance relationship between the macro and small nodes, respectively, and the associated user equipment.

4. The method according to claim 2, further comprising, at the small node side, providing a second parameter indicative of data transmission rate worsening that affects the small node when the macro node transmits at the macro node first transmission power during a limited-transmission sub-frame rather than when the small node transmits at the small node second transmission power during a no-transmission sub-frame, and a third parameter indicative of data transmission rate worsening that affects the small node when transmitting at the small node first transmission power during a normal transmission sub-frame rather than at the small node second transmission power during a no-transmission sub-frame, the determining at the small node side being also based on the second and third parameters.

5. The method according to claim 4, further comprising calculating first power consumption representing power consumed to transmit, during a normal transmission sub-frame, an amount of data configured to be transmitted with a resource in a no-transmission sub-frame, and a second power consumption representing the power consumed to transmit, during a limited-transmission sub-frame, the amount of data configured to be transmitted with a resource in a no-transmission sub-frame, wherein the no-transmission and limited transmission sub-frames define almost blank sub-frames, and wherein the determining at a small node side comprises:

if the power consumption of the small node during almost blank sub-frames is between the first and second power consumption, defining the normal-transmission sub-frames as the preferred sub-frames, or if the second power consumption is between the power consumption of the small node during almost blank sub-frames and the first power consumption, defining the no-transmission sub-frames as the preferred sub-frames, or if the first power consumption is between the power consumption of the small node during almost blank sub-frames and the second power consumption, defining the no-transmission sub-frames as the preferred sub-frames.

6. The method according to claim 2, further comprising, at each small node side:

providing to the macro node a number of usable limited-transmission sub-frames wherein, during a previous data transmission, interference perceived by the user equipment associated with the small node and caused by the macro node was below a predefined threshold.

7. The method according claim 6, further comprising, at each small node side:

providing to the macro node a percentage of resources allocated by the small node for data transmission in the usable limited-transmission sub-frames, and at a macro node side:

calculating the minimum numbers of no-transmission and limited-transmission sub-frames requested by the at least one small node according to the number of usable limited-transmission sub-frames and to the percentage of allocated resources.

8. The method according to claim 7, wherein the no-transmission and limited transmission sub-frames define almost blank sub-frames of the sub-frames pattern, the calculating comprising:

for each small node calculating a number of almost blank sub-frames requested by the small node as a product between the number of usable limited-transmission sub-frames and the percentage of allocated resources if the percentage is lower than 100%, or as the number of usable limited-transmission sub-frames increased by a predefined amount otherwise, and setting a number of limited-transmission sub-frames requested by the small node and a number of no-transmission sub-frames requested by the small node at 0 and at the number of almost blank sub-frames requested by the small node, respectively, if a number of usable sub-frames differs from the number of almost blank sub-frames configured in the previous sub-frame pattern, or, otherwise, at the number of almost blank sub-frames requested by the small node and 0, respectively, and calculating the minimum number (of no-transmission sub-frames requested by the at least one small node as the maximum among the numbers of no-transmission sub-frames requested by each small node, and the minimum number of limited-transmission sub-frames requested by the at least one small node according to a difference between the maximum among the number of limited-transmission sub-frames requested by each small node and the minimum number of no-transmission sub-frames requested by the at least one small node.

9. The method according to claim 6, wherein the determining comprises, if there are enough usable resources:

if normal transmission sub-frames are preferable from a power consumption standpoint, determining the number of normal transmission sub-frames as a number of required sub-frames for the user equipment belonging to both the first and second groups of user equipment, or if normal transmission sub-frames are not preferable from the power consumption standpoint determining the number of normal transmission sub-frames as the number of required sub-frames for only the user equipment belonging to the second group of user equipment, and determining the number of limited-transmission sub-frames according to the number of required sub-frames for the user equipment belonging to the first group of user equipment, to the number of required sub-frames to clear a load, and to the number of usable limited-transmission sub-frames in the sub-frame pattern.

10. The method according to claim 6, wherein the determining comprises:

if there are not enough usable resources, determining the number of limited-transmission sub-frames and the number of normal-transmission sub-frames based on a maximum required number of sub-frames for the user equipment belonging to both the first and second groups of user equipment, and signaling overload.

11. The method according to claim 1, further comprising, at the macro node side, providing a first parameter indicative of data transmission rate worsening affecting the macro node when transmitting at the macro node first transmission power during a limited-transmission sub-frame rather than at the macro node second transmission power during a normal-transmission sub-frame, the determining at the macro node side being also based on the first parameter.

12. A macro node for use in a cellular network, the macro node being configured for:

based on channel quality information from user equipment associated with the macro node, grouping the user equipment into a first group of the user equipment configured to be served at a macro node first transmission power and a second group of the user equipment that has to be served at a macro node second transmission power higher than the macro node first transmission power, determining a sub-frames pattern comprising a number of no-transmission sub-frames wherein data transmission is prevented at a macro node side, a number of limited-transmission sub-frames wherein data transmission is allowed at the macro node side at only the macro node first transmission power, and a number of normal-transmission sub-frames wherein data transmission is allowed at the macro node side at the macro node second transmission power, the determining being based on power consumption of the macro node, on data traffic associated with the macro node, and on minimum numbers of the no-transmission and limited-transmission sub-frames requested by at least one small node associated with the macro node according to the data traffic and interference conditions of the at least one small node, and serving the user equipment of the first and second groups of the user equipment associated with the macro node according to the sub-frames pattern.

13. A small node for use in a cellular network, the small node being configured for:

based on channel quality information from user equipment associated with the small node, grouping the user equipment into a first group of the user equipment configured to be served at a small node first transmission power and a second group of the user equipment that has to be served at a small node second transmission power higher than the small node first transmission power, receiving from a macro node a sub-frames pattern comprising a number of no-transmission sub-frames wherein data transmission is prevented at a macro node side, a number of limited-transmission sub-frames wherein data transmission is allowed at the macro node side at only a macro node first transmission power, and a number of normal-transmission sub-frames wherein data transmission is allowed at the macro node side at a macro node second transmission power, determining, among the no-transmission, limited-transmission and normal-transmission sub-frames, preferred sub-frames at which data transmission at a small node side is allowed, the determining being based on power consumption of the small node, on data traffic associated with the small node and to interference conditions thereof, and serving the user equipment of the first and second groups of the user equipment associated with the small node according to the preferred sub-frames.

* * * * *